United States Patent [19]

McCabe

[11] Patent Number: 4,919,329
[45] Date of Patent: Apr. 24, 1990

[54] THERMALLY ACTIVATED AUTOMATIC DAMPER AND DAMPER OPERATOR

[76] Inventor: Francis J. McCabe, 239 Hastings Ct., Doylestown, Pa. 18901

[21] Appl. No.: 342,496

[22] Filed: Apr. 24, 1989

[51] Int. Cl.⁵ .............................................. G05D 23/08
[52] U.S. Cl. .................................. 236/93 R; 236/1 G
[58] Field of Search ............... 236/DIG. 1, 1 G, 93 R, 236/49.2, 49.5

[56] References Cited

U.S. PATENT DOCUMENTS

| | | | |
|---|---|---|---|
| 2,462,198 | 2/1949 | Johnson | 236/93 R |
| 2,659,535 | 11/1953 | Hotchkins et al. | 236/49.5 |
| 3,595,475 | 7/1971 | Morton | 236/93 R |
| 4,223,779 | 11/1980 | Griffith | 236/49.5 X |
| 4,235,219 | 11/1980 | DeFoe | 236/93 R |
| 4,236,668 | 12/1980 | Prikkel, III | 236/93 R X |
| 4,372,485 | 2/1983 | McCabe | 236/1 G |
| 4,715,532 | 12/1987 | Sarozen, Jr. et al. | 236/49.5 |

*Primary Examiner*—William E. Tapolcai
*Attorney, Agent, or Firm*—Benasutti

[57] ABSTRACT

A damper has a frame with a cross bar and a reciprocal blade. A bimetallic element which moves in response to temperature is coupled to the blade and is hingedly coupled to the cross bar so that movement of the bimetallic element in response to temperature causes the blade to move with respect to the frame. The coupling of the bimetallic operator and the frame is accomplished by a biasing hinge which is coupled to the frame and to the bimetallic element to couple the bimetallic element to the frame and control the temperature movement response of the element. The biasing force of the biasing means is adjustable for controlling the temperature movement response of the damper blade. The bimetallic element is a serpentine spring having a plurality of bends and the biasing means is a hinge. The closed position of the blade of the damper, as well as the biased temperature response of the damper, and adjustable by rotation of adjustment screws.

6 Claims, 3 Drawing Sheets

FIG. 2
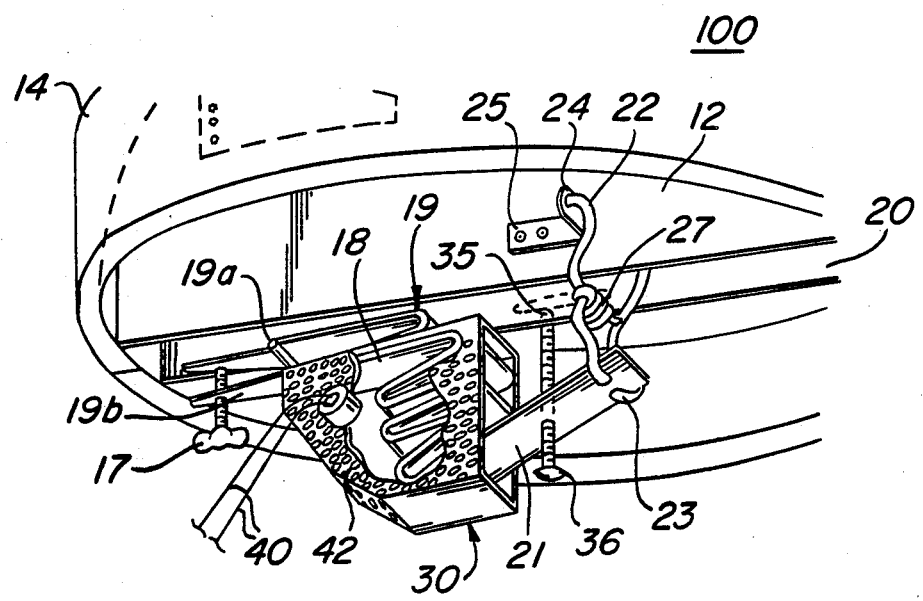
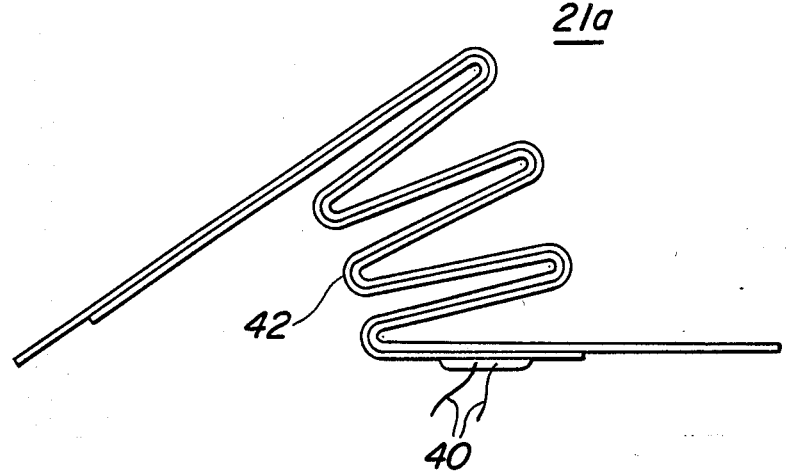
FIG. 4

THERMALLY ACTIVATED AUTOMATIC DAMPER AND DAMPER OPERATOR

BACKGROUND OF THE INVENTION

The present invention relates generally to dampers, and more particularly, to a thermal operator for use with such dampers.

A problem commonly encountered in the use of many heating systems such as oil and gas fired home and hot water heaters, as well as with wood and coal burning stoves and fireplaces, is that smoke and gas fumes are produced. These smoke and gas fumes must therefore be vented to the outside through a chimney or flue. This venting is done both to create the proper draft conditions for combustion and to avoid creating conditions hazardous to the inhabitants of the building where the the heating systems are used. However, such venting creates a permanent opening which, when the heating system is not in use, allows heat to escape from the structure being heated. This creates the potential for considerable energy losses and considerable unnecessary operating expenses.

To solve these problems, a variety of dampers have been developed which can be fitted into the vent chimney of heating systems to block the vent opening in a manner which conserves residual heat contained within the building, thus reducing the rate of fuel consumption. Essentially, such dampers generally used an external sensor to activate the damper operator and thereby open or close the damper to vent fumes a needed and conserve heat the rest of the time. For example, U.S. Pat. No. 4,123,001 issued to Kolt, and U.S. Pat. No. 3,921,900 issued to Cole, both show bellows activated systems for use with such dampers. U.S. Pat. No. 4,205,783 issued to Dietsch, discloses spring biasing means for use with a motor operated damper.

However, the problems and expenses encountered in adapting such activator systems to a particular damper and its associated chimney structure, as well as the cost of the power frequently required to operate such activator systems, can be sufficient to make the systems uneconomical. These costs may even be higher than the savings afforded by the reduction in losses which is provided by the damper.

It is therefore preferable that the damper be self-activating, so that when it is placed into a vent or flue, the damper can respond directly and automatically to the presence or absence of heat or pressure to open or close by itself. Using such a system no external source of power is required, providing substantial savings in costs. Moreover, this permits such a damper to be located in places where excessive heat loads exist. These heat loads can quickly degrade the electrical sensor wiring, of remotely controlled units. Additionally, automatic units can be used where external power lines are difficult or expensive to install. Further, such dampers were easier to adapt to a wide variety of operating conditions with a minimum of alteration or modifications. Such capabilities provided sufficient savings to make them economical, both in the initial fabrication of the damper, as well as in the field installation and ultimate use of the damper.

One approach which has been used in a effort to meet this need for a self-activating damper involves the use of a large, slotted flap or a plurality of interleaved bimetallic flaps, usually four, which are reciprocally positioned to be opened or closed according to the ambient temperature within the flue. However, such a self-activating device tends to suffer from a number of disadvantages. For example, each flap of the device must be self-activating, and therefore must be fabricated from relatively expensive bimetallic materials. Moreover, such materials, while flexible to some degree, are generally unable to completely fold out of the path of exiting smoke or gas fumes. Thus the flaps create a chimney restriction when the damper is opened. This restriction, at best, reduces surface efficiency by reducing chimney draft. At times this type of restriction can even cause smoke and gaseous combustion products to back up within the system and escape into the building thereby endangering inhabitants of the building.

Another disadvantage of such a damper is that the flaps must be specifically sized in order for the damper to be useful in a variety of applications. This adds to the normal scrap losses encountered in producing such a damper and adds significantly to its cost of production.

Lastly, bimetallic material is relatively stiff. As a result, flaps manufactured using such materials do not respond quickly. Because of this, in furnaces in which an increase of pressure can occur before an increase of temperature, for example, oil fire furnaces, such flaps are unable to open quickly enough to relieve the pressure produced. It is for this reason that such damper systems are not recommended for use with oil fire furnaces.

It is therefore desirable to provide a damper having a self-actuating damper operator which can be constructed of low cost, general purpose components, yet which is readily adaptable to a wide variety of installation situations and operational conditions. Such a system would significantly reduce, the foregoing problems. A solution to this problem is suggested in U.S. Pat. No. 4,372,485 issued to McCabe on Feb. 8, 1983 and titled "Thermally Activated, Automatic Damper and Damper Operator". The damper operator of McCabe is a butterfly type damper, constructed primarily to perform as an air, smoke and fire damper as described in U.S. Pat. No. 4,146,048 issued Mar. 27, 1979 and entitled "Fire Damper and Method of Construction" and U.S. Pat. No. 3,889,314 issued June 17, 1975 and entitled "Heat Actuated Link". All three of these patents, U.S. Pat. Nos. 4,372,485, 4,146,048, and 3,889,314 are incorporated by reference as if fully set forth herein.

In the thermally activated automatic damper of U.S. Pat. No. 4,372,485, the butterfly damper includes a pair of complementary damper blades which are engaged by hinge elements on a cross bar extending across the length of the damper frame to bridge the duct in which the damper is installed. If preferred, the cross bar may also be directly attached to the opposing side walls of the duct. In the fully opened position, the damper blades are caused to assume a position in which they are substantially parallel to one another, and to the air flow through the duct. This minimizes resistance to the air flow through the duct In the fully closed position, the damper blades and the cross bar combine to substantially seal the duct. The frame, blade and cross bar components are readily adaptable for use in varied applications.

The damper is provided with a self-actuating damper operator mechanism which generally comprises a bimetallic, serpentine thermal spring element. One end of the bimetallic element is attached to the cross bar and the other end is pivotally connected to the blades of the damper by a pair of linkages. The operation of the damper occurs when the ambient temperature surrounding the thermal spring element changes.

For example, the damper and damper operator of the thermally activated system can be used in a flue damper. In such a case, when the thermal spring element is cooled, the damper operator is set to assume its closed position. As the element is heated its bimetallic structure causes it to flex. This flexing causes the attached linkages to rotate the damper blades to their open positions. When the thermal spring element is cooled, the reverse effect occurs and the blades are again closed. This operation is continuous and passive, since no external sensors or power source are needed to obtain these results except the heat rise.

The thermally activated automatic damper could also be used with other types of dampers, for example, ceiling mounted smoke/fire dampers. In such an application, the damper is generally provided to complement a fire rated secondary ceiling to prevent heat damage to the primary ceiling and its structural support for a rated time period. For smoke vent dampers, the thermal spring element is caused to operate as described above, causing the blades to open when heated, to permit smoke to escape from the room, and to close when cooled. For fire dampers, operation of the thermal spring element is reversed, so that the blades close when heated and open when cooled.

Dampers of this type can also be used to provide damper control for use in air conditioning systems. In air conditioning applications the dampers respond to changes in room temperature in such a way that the conditioned air admitted to a selected area can be regulated to maintain a uniform temperature therein. However, in such an application it is generally necessary to avoid systems imbalances by assuring that there is always some minimum amount of air being admitted to an area. This is accomplished by providing a thermal spring element with means for volume adjustment. The volume adjustment assures that the blades of the damper remain open a sufficient amount of time to maintain a proper flow through the air duct within which the damper is placed.

Additionally, in pilot operated systems for remotely controlled systems, a further remote operator can be provided for use with the thermally activated automatic damper to further control the opening and closing of the damper in order to remotely maintain stable operating conditions within the systems.

However, in systems using the thermally activated automatic dampers it is difficult to control the fully closed position. This is important where economic considerations require a damper design which can be used in a number of different applications which require differing amounts distance between the "fully closed" positions of the blades and the actual sealing position of the damper to provide differing air flow conditions.

Additionally, the response time and the speed of the opening and closing of the damper blades in the prior art automatic thermally activated dampers, as well as the temperature at which the dampers actuated could not be conveniently controlled and modification of the response time and the speed of opening and closing of the blades and the actuated temperature are important in designing dampers.

Thus it is an object of the present invention to provide a thermally activated automatic damper wherein the fully closed position of the damper can be conveniently and reliably controlled.

It is a further object of the present invention to provide a thermally activated automatic damper wherein the response time and the speed and temperature of opening and closing operation of the damper can be controlled.

SUMMARY OF THE INVENTION

A damper has a frame with a cross bar and a reciprocal blade. A bimetallic element which responds to temperature is coupled to the blade and is hingedly coupled to the cross bar so that movement of the bimetallic element in response to temperature causes the blade to move with respect to the frame. The coupling of the bimetallic operator and the frame is accomplished by a biasing hinge which is fixedly coupled to the frame and to the bimetallic element. The coupling of the bimetallic element and the frame makes it possible to bias the bimetallic element and permits control of the movement response of the element with respect to temperature by adjusting the biasing force of the bimetallic element. Control of the temperature response can also be accomplished by adjusting the pretension of the bimetallic element on strength of the linkage spring.

BRIEF DESCRIPTION OF THE DRAWINGS

FIG. 2 is a perspective view of the improved thermally activated automatic damper of the present invention, similar to the damper of FIG. 1, further including a thermal element which is hingedly connected between the operator of the damper and the cross bar of the frame.

FIG. 4 shows an alternate embodiment of the bimetallic element of FIG. 1 wherein a thermal pad is provided for remote by controlling the operation of the damper of FIG. 1.

DETAILED DESCRIPTION OF THE INVENTION

Figure 1:
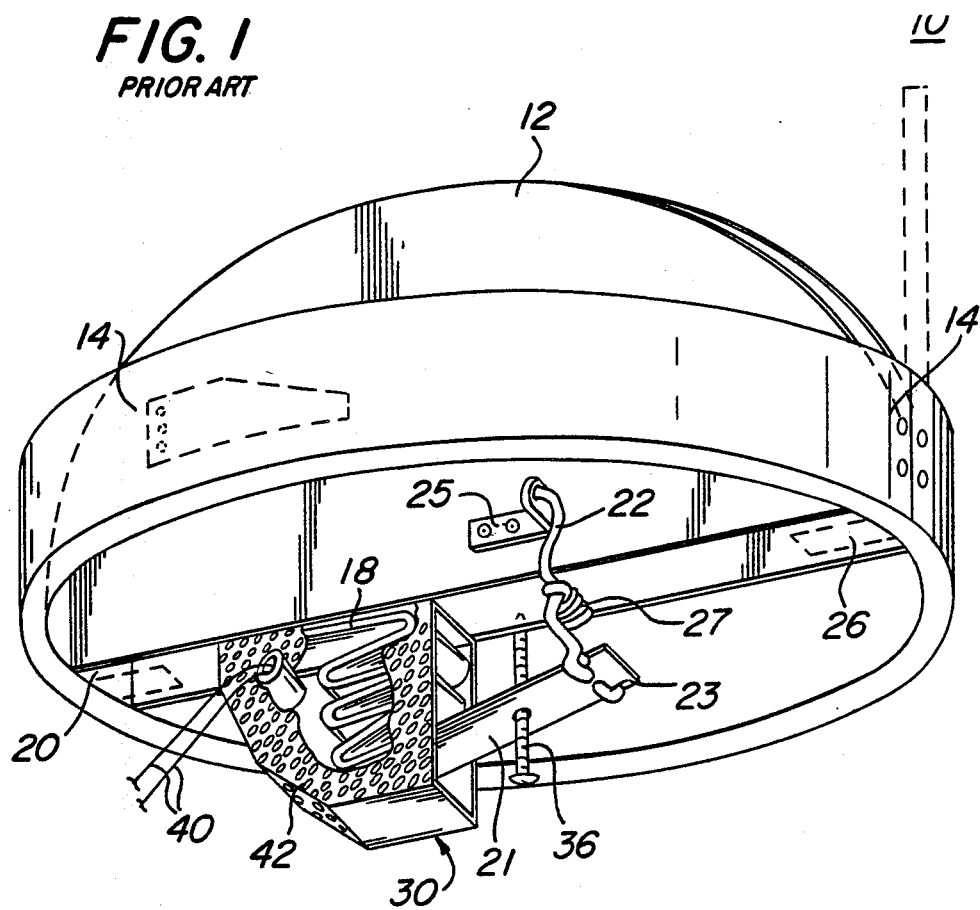
FIG. 1 is a perspective view of a prior art automatic thermally activated damper, showing the frame, blade and damper operator of the prior art damper.

Referring now to FIGS. 1 and FIG. 2, there are shown prior art thermally activated automatic damper 10 and a thermally activated damper 100 of the present invention respectively wherein thermally activated automatic damper 100 includes resilient biasing hinge 19 of the present invention. Dampers 10, 100 each comprise a pair of rotatable semicircular blades 12 on a frame 14. Each semicircular blade 12 contains an integral shaped hinge running across its flat edge. The hinges along the flat edges of blades 12 are coupled to further integral hinges along diametric mounting bracket 20 or cross bar 20. Cross bar 20 is attached to a set of mounting brackets 26, one at each end of cross bar 20 to attach cross bar 20 to the sides of frame 14.

Within each damper 10, 100 is a serpentine bimetallic spring 21 which is connected at its outer end to blades 12 through a pair of connection linkages 22. Connection linkages 22 are pivotally connected to pivot points 23 on bimetallic serpentine spring 21 and to points 24 on mounting brackets 25, one on each semicircular blade 12. The inner end 18 of serpentine bimetallic spring 21 within damper 10 is fixedly connected to diametric cross bar 20 and securely held in place by a fixed connection to cross bar 20. However within damper 100 of the present invention the connection between bimetallic element 21 and cross bar 20 is not fixed. The inner end 18 of serpentine bimetallic spring 21 within damper 100 of the present invention is fixedly connected to lower arm 19b of biasing hinge 19 which couples bimetal spring 21 to cross bar 20. Thus hinge 19 may be seen as an optional adaptation to damper 10 to form damper 100.

Bimetallic spring 21 within damper 100 is coupled to cross bar 20 by way of biasing hinge 19 for the purpose of rotatably moving and biasing bimetallic spring 21 and to control the temperature at which damper 100 is actuated. Lower arm 19a of spring hinge 19 is secured to diametric mounting bar 20 by suitable fixing means. Thus operator 30 is hingedly rotated in accordance with the relative positions of upper arm 19a and lower arm 19b of hinge 19 and is biased with respect to cross bar 20 and frame 14. Screw 17, threadably associated with upper arm 19a and lower arm 19b of hinge spring 19, allows the relative positions of upper arm 19a and lower arm 19b to be conveniently adjusted to control the amount of biasing. As the relative positions of arms 19a, b are changed operator 30 is rotated causing the biasing force upon spring 21 to be correspondingly adjusted. Alteration of this biasing force permits control of the temperature at which damper 100 actuates.

The moveable bimetallic spring 21 of the present invention operates to open blades 12 when it is heated. This occurs because when bimetallic spring 21 is heated, it expands and relaxes causing it to rotate inwardly towards frame 14 due to the serpentine shape of bimetallic spring 21. This inward rotation pushes upwardly on normally closed blades 12, by way of linkage arms 22 and brackets 25. Spring 27, coupled to linkage arms 22 and biasing connection arms 22 toward each other, provide a snap response in which blades 12 open suddenly at a predetermined temperature. When connection arms 22 press upwardly on normally closed blades 12, normally closed blades 12 are caused to open and to allow the escape of hot combustion products. When combustion ceases spring 21 cools and flexes inwardly to pull blades 12 back to their normally closed rest position.

In order to provide volume control of dampers 10,100, screw 36 is threadably attached to the outer end of bimetal spring 21 in such a way that the machined inner end 35 is directed towards bracket 20. The position of closed blades 12 is controlled by adjusting screw 36. The degree to which blades 12 can close when spring 21 is actuated is controlled by volume adjust screw 36 which is screwed through spring 21 towards bracket 20. Thus when volume adjust screw 36 is turned clockwise, it is advanced through spring 21 towards bar 20. Under these conditions it takes relatively little relaxation of the activated spring for machined end 35 to move forward so as to make contact with bracket 20. Thus further opening of blades 12 is prevented. Thus initial maximum air flow through dampers 10, 100 is prevented.

Conversely, counterclockwise turning of screw 36 causes end 35 to retract away from bar 20 so that a greater amount of opening will occur before the aforesaid stopping contact is made. This adjustment of the subject apparatus is important in system such as coal fire or wood fire systems which operate more or less continuously and therefore emit a continuous stream of combustion products. Using operator 30 semicircular blades 12 can easily be set so that they do not completely seal the duct in a closed state thus allowing the products of combustion to escape. However, in so doing, enough turbulence and gas flow impedance is created so that a large portion of heat in these gases is retained within the system.

The degree to which blades 12 can close when bimetal spring 21 is actuated is additionally controlled by the relative positions of upper arm 19a and lower arm 19b of hinge 19 within damper 100. As mentioned previously, the relative position of upper arm 19a and lower arm 19b is controlled by screw 17. By increasing the separation distance between upper arm 19a and lower arm 19b of hinge 19, semicircular blades 12 will further open a corresponding amount.

In addition, by changing the relative positions of upper arm 19a and lower arm 19b the amount of force on spring 21 and spring 27 is increased or decreased. This increase or decrease in the amount of force on spring 21 or spring 27 controls the response time and speed of movement of the damper as well as the air flow. Most importantly however this adjustment of the force on spring 21 or spring 27 affects the response temperature. Thus, using screw 17 damper 100 may be adjusted to snap open at, for example, 185° F. Screw 17 can be readjusted to cause damper 100 to open, for example, at 212° F. Thus the activation temperature of damper 100 can be adjusted manually by adjusting the position of hinge 19 using screw 17.

The temperature at which the blades 12 close in response to the temperature of bimetallic element 21 is controlled by the amount of pretension in bimetallic element 21 and is relative to the force of spring 27. When the force of the deformation of a bimetallic element 21 being heated overcomes the pretension of the element 21, movement of the element 21 opens the damper blades 12. Thus in the prior art in order to provide dampers closing at different temperatures, specifically designed bimetallic elements 21 were having differing pretensions designed and assembled with the damper.

Figure 3:
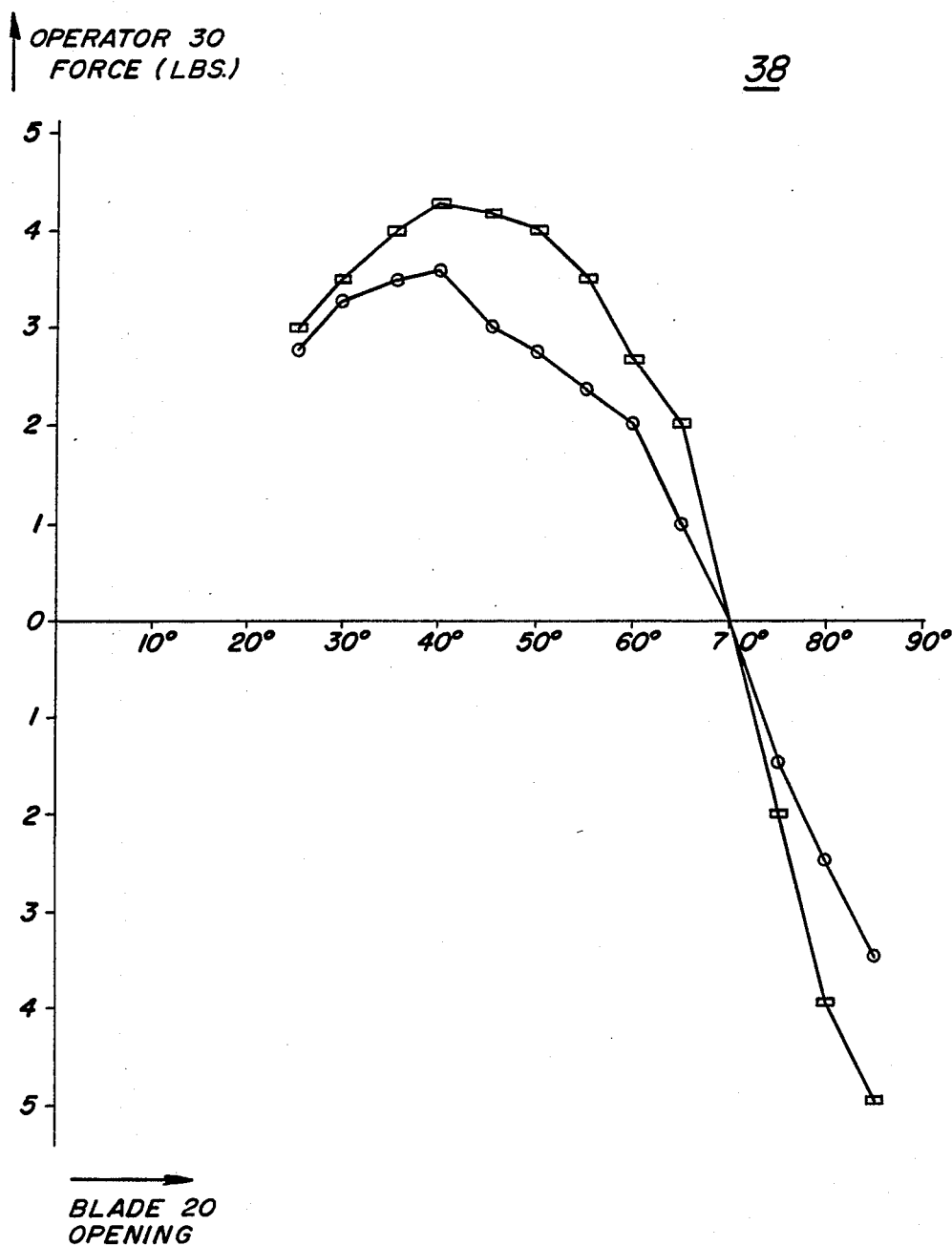
FIG. 3 shows a graphical representation of the relationship between the operator force in pounds and the opening of the blade of the damper of FIG. 1 in degrees.

Graph 38 of FIG. 3 shows the relationship between the blade 12 opening angle in degrees and two specific spring 27 forces relatively applied to bimetallic element 21 with some typical bimetallic pretensions. The pretension determining the temperature response of a damper 100 is the net result of the forces of spring 27 pulling linkages 22 towards each other, bimetallic spring 21, and hinge 19. As the total resilient force of these spring forces is adjusted, the relationship between blade 21 opening in degrees and the operating force changes. For example, graph 38 shows curves corresponding to two different wire diameters of spring 27.

The amount of biasing force applied to bimetallic element 21 by resilient hinge 19 adjusts the pretension response of bimetallic spring 21 without changing the design or shape of bimetallic spring 21 and without modifying spring 27. Thus if a different temperature response is required for damper 100, rather than providing a different bimetallic spring 21, the biasing force applied against spring 21 can be altered by adjusting screw 17 of resilient hinge 19 thereby providing a different biasing force and a different pretension on bimetallic spring 21. The resulting change in pretension provides a different temperature response for spring 21 causing blades 12 of damper 100 to close at a different temperature without modification of spring 21.

While the present invention is described with respect to a normally closed thermally actuated automatic damper 100, it will be understood by those skilled in the art that biasing spring 19 of the present invention can be practiced with a normally closed thermally actuated automatic damper as well. To adapt the system of the present invention in this manner bimetallic spring 21 is reversed within operator 30 so that bimetallic spring 21 opens outwardly rather than inwardly. This positioning of spring 21 causes semicircular blades 12 to close rather than to open when spring 21 is heated. Likewise, blades 12 close when spring 21 is cooled if spring 21 is thus reversed.

Furthermore, it will be understood by those skilled in the art that in pilot operated systems or remotely controlled systems, an additional operator such as heating element 42 shown in FIG. 4 can be combined with the improved thermally activated automatic dampers 10, 100 of the present invention. The additional heating element 42 within operator 30 can control the opening and closing of automatic dampers 10, 100 and thus maintain stable operating conditions within a heating system. Bimetallic strip 21a which is an alternate embodiment of bimetallic strip 21, can thus be used to open damper 100 from a remote location.

For example, using electrical wires 40 electrical energy can be applied to operator 30 to cause heating element 42 within operator 30 to heat bimetallic spring 21a. Bimetal spring 21a, heated by the electrical current passing through wires 40, causes damper 100 to open or close thereby permitting remote control of damper 100. Thus both electric and fire heat control are provided for safety operation in smoke vents and fire dampers It will also be understood that various other changes in the details, materials and arrangements of the parts which have been herein described as illustrated in order to explain the nature of this invention, may be made by those skilled in the art within the principle and scope of the invention as expressed in the following claims.

I claim:

1. For a damper having a frame and at least one reciprocal blade operatively associated therewith, an improved damper operator comprising:

a bimetallic element having a temperature movement response;

means for coupling the blade to the bimetallic element so that the temperature movement response of the bimetallic element causes the blade to move; and, rotatably moveable hinge means for coupling the bimetallic element to the frame for biasing the bimetallic element to adjust the temperature movement response.

2. The damper of claim 1 wherein the bimetallic element is a serpentine spring having a plurality of bends.

3. The damper of claim 1 wherein the damper comprises two reciprocal blades, each of which is connected to and pivotally associated with the bimetallic element by an individual linkage.

4. The damper of claim 1 further comprising electrical heating means for applying heat to the bimetallic element and controlling the movement of bimetallic element from a remote location.

5. For a damper having a frame and at least one reciprocal blade operatively associated therewith, an improved damper operator comprising:

a bimetallic element having a temperature movement response;

means for coupling a face portion of the blade to the bimetallic element so that movement of the bimetallic element causes the blade to move;

adjustment means for maintaining the blade at a selected position intermediate a fully opened position and a fully closed position comprising a threaded screw extending through portions of the bimetallic element and into contact with a cross bar attached to the damper frame; and rotatably moveable hinge means coupled to the crossbar and the bimetallic element for positioning the bimetallic element with respect to the frame to control the temperature movement response of the bimetallic element.

6. The damper of claim 5 wherein the rotational movement of the hinge means is adjustable by means of a screw.

* * * * *